United States Patent
Ahn et al.

(10) Patent No.: US 11,961,207 B2
(45) Date of Patent: Apr. 16, 2024

(54) IMAGE PROCESSING APPARATUS PERFORMING A DECONVOLUTION OPERATION AND OPERATION METHOD THEREOF

(71) Applicant: SAMSUNG ELECTRONICS CO., LTD., Suwon-si (KR)

(72) Inventors: Iljun Ahn, Suwon-si (KR); Yongsup Park, Suwon-si (KR); Jaeyeon Park, Suwon-si (KR); Minsu Cheon, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 359 days.

(21) Appl. No.: 17/271,328

(22) PCT Filed: Sep. 11, 2019

(86) PCT No.: PCT/KR2019/011858
§ 371 (c)(1),
(2) Date: Feb. 25, 2021

(87) PCT Pub. No.: WO2020/055181
PCT Pub. Date: Mar. 19, 2020

(65) Prior Publication Data
US 2021/0183015 A1  Jun. 17, 2021

(30) Foreign Application Priority Data
Sep. 13, 2018 (KR) .................. 10-2018-0109874

(51) Int. Cl.
*G06T 3/40* (2006.01)
*G06N 3/04* (2023.01)
(Continued)

(52) U.S. Cl.
CPC ............ *G06T 3/4046* (2013.01); *G06N 3/04* (2013.01); *G06N 3/084* (2013.01); *G06T 5/002* (2013.01); *G06T 2207/20084* (2013.01)

(58) Field of Classification Search
CPC .................. G06T 3/4046; G06T 5/002; G06T 2207/20084; G06T 5/003; G06T 1/20;
(Continued)

(56) References Cited

U.S. PATENT DOCUMENTS 7,525,526 B2  4/2009  Brown Elliott et al.
8,588,544 B2  11/2013  Lei et al.
(Continued)

FOREIGN PATENT DOCUMENTS

KR  10-2008-0085197 A  9/2008
KR  10-2011-0040707 A  4/2011
(Continued)

OTHER PUBLICATIONS

H. Yonekawa and H. Nakahara, "On-chip memory based binarized convolutional deep neural networks applying batch normalization free technique on an FPGA," in Proc. IPDPSW, 2017, pp. 98-105. (Year: 2017).*

(Continued)

*Primary Examiner* — Andrae S Allison
(74) *Attorney, Agent, or Firm* — Sughrue Mion, PLLC (57) ABSTRACT

Provided is an image processing apparatus including a memory storing one or more instructions and a processor configured to execute the one or more instructions stored in the memory, wherein the processor is further configured to execute the one or more instructions to generate a second image by performing a deconvolution operation on a first image and a kernel comprising one or more weights, set values of the one or more weights based on the second (Continued)

image, and adjust the values of the one or more weights based on positions of the one or more weights in the kernel.

16 Claims, 10 Drawing Sheets

(51) Int. Cl.
  *G06N 3/084* (2023.01)
  *G06T 3/4046* (2024.01)
  *G06T 5/00* (2006.01)
(58) Field of Classification Search
  CPC ... G06T 1/60; G06T 7/00; G06N 3/04; G06N 3/084; G06N 3/045; G06F 17/153; G06F 17/10
  See application file for complete search history.

(56) References Cited

U.S. PATENT DOCUMENTS

| | | | | |
|---|---|---|---|---|
| 10,909,659 | B2* | 2/2021 | Croxford | G06N 3/045 |
| 11,057,585 | B2* | 7/2021 | Kim | G06T 1/20 |
| 2007/0201732 | A1 | 8/2007 | Wahlsten | |
| 2011/0085743 | A1 | 4/2011 | Lei et al. | |
| 2013/0121568 | A1* | 5/2013 | Krishnan | G06T 3/4053 382/300 |
| 2016/0335120 | A1* | 11/2016 | Gupta | G06F 9/5044 |
| 2018/0075581 | A1 | 3/2018 | Shi et al. | |
| 2018/0150740 | A1 | 5/2018 | Wang et al. | |
| 2019/0052891 | A1* | 2/2019 | Cain | G06T 1/0085 |
| 2020/0097778 | A1* | 3/2020 | Rozner | G06V 10/50 |
| 2020/0364829 | A1* | 11/2020 | Ahn | G06V 10/764 |
| 2022/0019844 | A1* | 1/2022 | Park | G06V 10/82 |
| 2023/0069072 | A1* | 3/2023 | Ahn | G06T 5/002 |

FOREIGN PATENT DOCUMENTS

| | | |
|---|---|---|
| KR | 10-2011-0046544 A | 5/2011 |
| WO | 2018/152071 A1 | 8/2018 |

OTHER PUBLICATIONS

S. Motohashi, T. Nagata, T. Goto, R. Aoki and H. Chen, "A study on blind image restoration of blurred images using R-map," 2018 International Workshop on Advanced Image Technology (IWAIT), Chiang Mai, Thailand, 2018, pp. 1-4, doi: 10.1109/IWAIT.2018. 8369650. (Year: 2016).*

[1]Chang, J.-W., Kang, K.-W., and Kang, S.-J., "An Energy-Efficient FPGA-based Deconvolutional Neural Networks Accelerator for Single Image Super-Resolution", <i>arXiv e-prints</i>, Jan. 2018. doi:10.48550/arXiv.1801.05997. (Year: 2018).*
C. Zhang, Zhenman Fang, Peipei Zhou, Peichen Pan and Jason Cong, "Caffeine: Towards uniformed representation and acceleration for deep convolutional neural networks," 2016 IEEE/ACM International Conference on Computer-Aided Design (ICCAD), Austin, TX, USA, 2016, pp. 1-8, doi: 10.1145/2966986.2967011. (Year: 2016).*
Communication dated Feb. 11, 2022, issued by the INDIA Intellectual Property Office in Indian Patent Application No. 202127016791.
Communication dated Dec. 20, 2019 issued by the International Searching Authority in counterpart Application No. PCT/KR2019/ 011858 (PCT/ISA/220, PCT/ISA/210, and PCT/ISA/237).
Andrew Aitken et al., "Checkerboard artifact free sub-pixel convolution", Jul. 10, 2017, 16 pages total.
Justin Johnson et al., "Perceptual Losses for Real-Time Style Transfer and Super-Resolution", arXiv:1603.08155v1 [cs.CV], Stanford Univ., Mar. 27, 2016, 18 pages total.
Christian Ledig et al., "Photo-Realistic Single Image Super-Resolution Using a Generative Adversarial Network", arXiv:1609. 04802v1 [cs.CV], ResearchGate, Sep. 15, 2016, 15 pages total.
Communication dated Oct. 24, 2022 issued by the Korean Patent Office in application No. 10-2018-0109874.
Anonymous, "Richardson-Lucy deconvolution", Wikipedia, https:// en.wikipedia.org/w/index.php?title=Richardson-Lucy_deconvolution &oldid=856160373, Aug. 23, 2018, 2 pages.
Sugawara, Y., et al., "Super-Resolution Using Convolutional Neural Networks Without Any Checkerboard Artifacts", ICIP 2018, pp. 66-70.
Harada, Y., et al., "Multidimensional Multirate Filter without Checkerboard Effects", EUSIPCO 1998, 4 pages.
Communication dated Sep. 27, 2021, issued by the European Patent Office in counterpart European Application No. 19860736.8.
Wikipedia, "Richardson-Lucy deconvolution", Last edited Aug. 23, 2018, Total 2 pages.
Sugawara et al., "Super-Resolution Using Convolutional Neural Networks Without Any Checkerboard Artifacts," 2018 25th IEEE International Conference on Image Processing (Icip), IEEE, Sep. 6, 2018, pp. 66-70.
Harada et al., "Multidimensional Multirate Filter without Checkerboard Effects," 9th European Signal Processing Conference (EUSIPCO 1998), IEEE, Sep. 8, 1998, Total 4 pages.
Notice of Allowance dated Apr. 4, 2023, issued by Korean Patent Office in Korean Patent Application No. 10-2018-0109874.
Office Communication dated Feb. 16, 2024, issued by the European Patent Office in counterpart European Application No. 19860736.8.

* cited by examiner

IMAGE PROCESSING APPARATUS PERFORMING A DECONVOLUTION OPERATION AND OPERATION METHOD THEREOF

TECHNICAL FIELD

Various embodiments of the disclosure relate to an image processing apparatus for performing a deconvolution operation and an operating method thereof, and more particularly, to an image processing apparatus for preventing occurrence of a checkerboard artifact when a deconvolution operation is performed, and an operating method thereof.

BACKGROUND ART

Data traffic has increased exponentially with the development of computer technology, and thus artificial intelligence has become an important trend driving future innovation. Because artificial intelligence uses a method that imitates human thinking, artificial intelligence may be, in fact, applied infinitely to all industries. Examples of representative technology of artificial intelligence include pattern recognition, machine learning, expert systems, neural networks, and natural language processing.

Neural networks are modeled by mathematical expressions of the characteristics of human biological neurons and use an algorithm that imitates the human ability to learn. Through this algorithm, the neural networks may generate mapping between input data and output data, and the ability to generate such mapping may be expressed as a learning ability of the neural networks. Also, the neural networks have a generalization ability that enables generation of correct output data for input data that has not been used for learning based on learned results.

In a convolution neural network (CNN) or the like, a deconvolution layer may be used to generate an output image having a size greater than a size of an input image. However, when a deconvolution operation is performed by using a deconvolution layer, the degree of overlapping of a kernel for each position of the output image varies according to a size of a stride and a size of the kernel, which are used in the deconvolution operation. Accordingly, there is a problem in that a checkerboard artifact occurs in the output image.

DESCRIPTION OF EMBODIMENTS

Solution to Problem

Various embodiments of the disclosure may provide an image processing apparatus capable of preventing occurrence of a checkerboard artifact when a deconvolution operation is performed, by performing normalization based on positions of weights included in a kernel used in the deconvolution operation, and an operating method thereof.

Advantageous Effects of Disclosure

An image processing apparatus according to an embodiment may prevent occurrence of a checkerboard artifact caused by a deconvolution operation.

The image processing apparatus according to an embodiment may adjust (e.g., enlarge) a size of an image by performing a deconvolution operation and generate a high-quality image by adjusting the size of the image according to the deconvolution operation.

The image processing apparatus according to an embodiment may reduce an amount of operations and a size of a memory by adjusting the size of the image with the deconvolution operation, as compared with using other operations.

BEST MODE

An image processing apparatus according to an embodiment includes a memory storing one or more instructions, and a processor configured to execute the one or more instructions stored in the memory, wherein the processor is further configured to execute the one or more instructions to generate a second image by performing a deconvolution operation on a first image and a kernel including one or more weights, set values of the one or more weights based on the second image, and adjust the values of the one or more weights based on positions of the one or more weights in the kernel.

The processor according to an embodiment may be further configured to execute the one or more instructions to divide the one or more weights into a plurality of groups based on the positions of the one or more weights, and normalize each of the plurality of groups.

The processor according to an embodiment may be further configured to execute the one or more instructions to adjust the values of the one or more weights so that sums of weights respectively included in the plurality of groups are equal to each other.

The processor according to an embodiment may be further configured to execute the one or more instructions to adjust the values of the one or more weights so that a sum of weights included in each of the plurality of groups is 1.

The processor according to an embodiment may be further configured to execute the one or more instructions to determine a number of the plurality of groups based on a size of the kernel and a size of a stride used in the deconvolution operation.

The processor according to an embodiment may be further configured to execute the one or more instructions to determine a number of the weights included in each of the plurality of groups based on a size of the kernel and a size of a stride used in the deconvolution operation.

The processor according to an embodiment may be further configured to execute the one or more instructions to adjust the values of the weights by applying a reliability map including a smoothing function to the kernel.

The smoothing function according to an embodiment may include a function of a form in which a value gradually changes based on a center of the reliability map.

The smoothing function according to an embodiment may include at least one of a linear function, a Gaussian function, a Laplacian function, or a spline function.

A size of the second image according to an embodiment may be greater than a size of the first image.

An operating method of an image processing apparatus according to an embodiment includes generating a second image by performing a deconvolution operation on a first image and a kernel comprising one or more weights, setting values of the one or more weights based on the second image, and adjusting the values of the one or more weights based on positions of the one or more weights in the kernel.

A computer program product according to an embodiment may include one or more computer-readable recording media having stored therein a program for generating a second image by performing a deconvolution operation on a first image and a kernel comprising one or more weights, setting values of the one or more weights based on the second image, and adjusting values of the one or more weights based on positions of the one or more weights in the kernel.

Mode of Disclosure

Terms used in the specification will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

It will be understood that when a certain part "includes" a certain component, the part does not exclude another component but can further include another component, unless the context clearly dictates otherwise. The terms such as "unit" or "module" refer to units that perform at least one function or operation, and the units may be implemented as hardware or software or as a combination of hardware and software.

Hereinafter, embodiments of the disclosure will be described in detail with reference to the accompanying drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, like reference numerals denote like elements.

Figure 1:
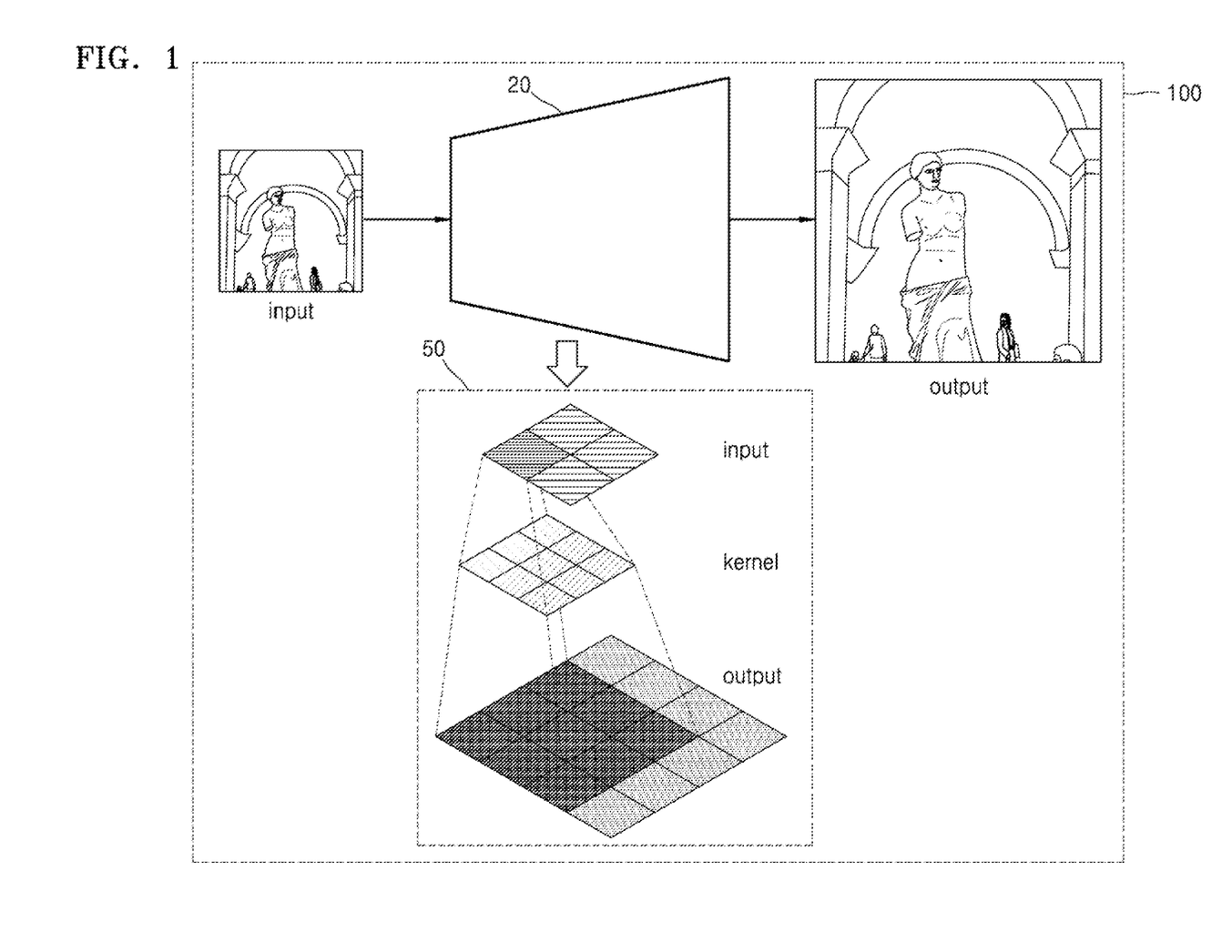
FIG. 1 illustrates a method, performed by an image processing apparatus, of generating an image by using a deconvolution operation, according to an embodiment.

FIG. 1 illustrates a method, performed by an image processing apparatus, of generating an image by using a deconvolution operation, according to an embodiment.

Referring to FIG. 1, an image processing apparatus 100 according to an embodiment may generate an image by using a neural network 20. The image processing apparatus 100 may extract feature information about a first image (input) by using the neural network 20 and generate a second image (output) based on the extracted feature information.

The neural network 20 may include one or more deconvolution layers, and a deconvolution operation 50 may be performed in each of the deconvolution layers with respect to an image (input) input to each of the deconvolution layers and a kernel. As a result of the deconvolution operation, an output image (output) may be generated. The deconvolution operation 50 will be described in detail with reference to FIGS. 2 and 3.

The deconvolution operation 50 may be used to generate an output image having a size generally greater than a size of an input image in a convolution neural network (CNN). For example, the deconvolution operation 50 may be used in various fields such as super-resolution image generation, autoencoders, style transfer, etc. However, the disclosure is not limited thereto.

A size of the second image (output) generated as a result of the deconvolution operation is greater than a size of the first image (input).

When performing the deconvolution operation, a checkerboard artifact having a checkerboard shape may occur. The reason for the occurrence of the checkerboard artifact will be described in detail with reference to FIGS. 3 and 4.

The image processing apparatus 100 according to an embodiment may adjust values of weights included in kernels used for the deconvolution operation so that a checkerboard artifact does not occur.

Figure 2:
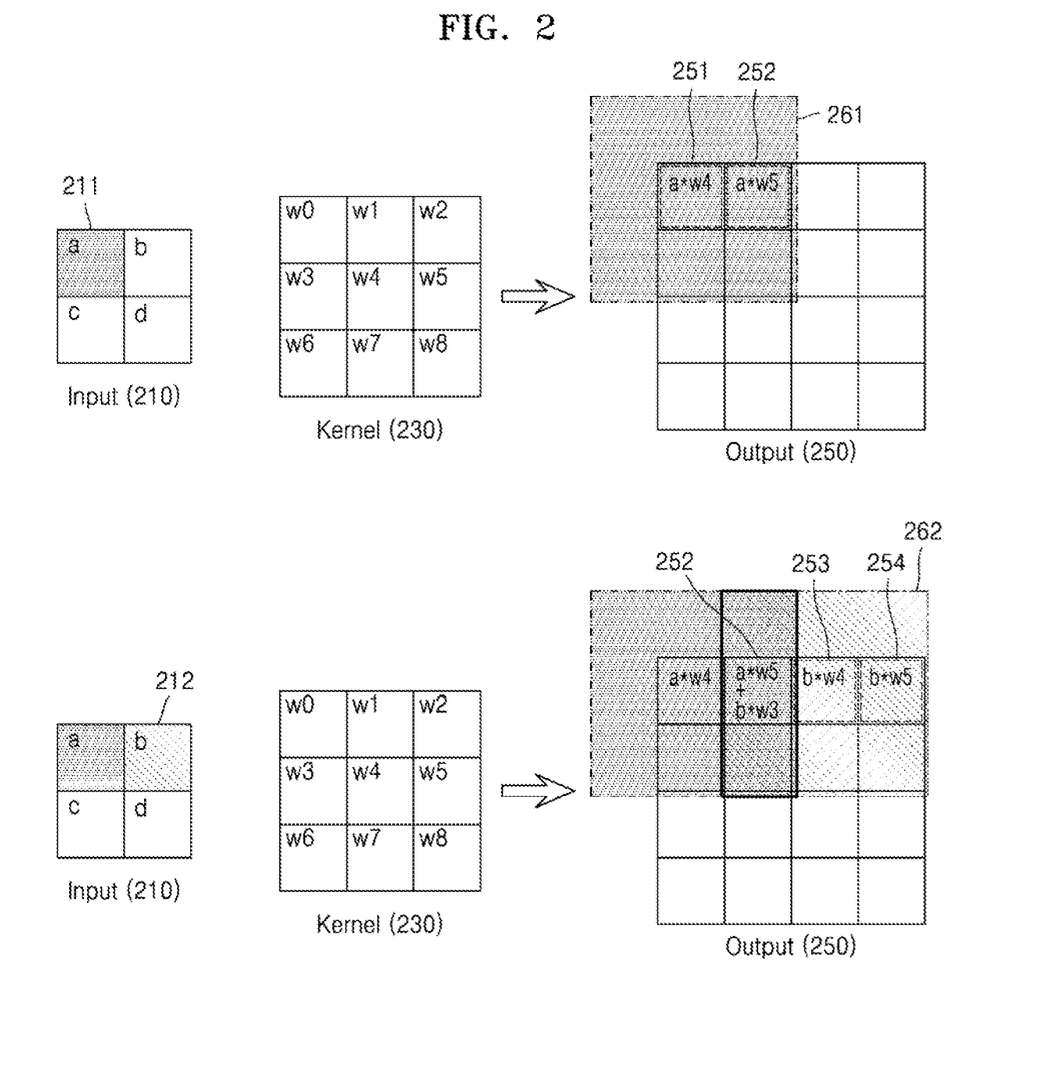
FIG. 2 is a reference diagram for describing a process of performing a deconvolution operation, according to an embodiment.

FIG. 2 is a reference diagram for describing a process of performing a deconvolution operation, according to an embodiment.

For convenience of description, in FIG. 2, it is assumed that a size of input data 210 is 2×2, a size of a kernel 230 used in the input data 210 is 3×3, a size of a stride is 2, a size of output data 250 is 4×4, and a padding value is 1.

Referring to FIG. 2, the image processing apparatus 100 may perform a deconvolution operation by applying the kernel 230 to an upper-left pixel 211 of the input data 210. That is, the image processing apparatus 100 may map values obtained by multiplying a pixel value a by each of weights w0, w1, w2, w3, w4, w5, w6, w7, and w8 included in the kernel 230, to each of pixels included in a first region 261 of the output data 250. In this regard, the image processing apparatus 100 may determine a start position of the first region 261 by considering that the padding value is 1 (for example, a start point of the first region 261 may be a point which is moved by one pixel to the left and to the top from a first pixel 251 of the output data 250).

The image processing apparatus 100 may map a value a*w4 obtained by multiplying the pixel value a by the weight w4 to the first pixel 251 of the output data 250 and map a value a*w5 obtained by multiplying the pixel value a by the weight w5 to a second pixel 252 of the output data 250.

Also, the image processing apparatus 100 may map values obtained by multiplying a pixel value b of an upper-right pixel 212 of the input data 210 by each of the weights w0 to w8 included in the kernel 230, to each of pixels included in a second region 262 which is moved by two pixels from the first region 261 of the output data 250. For example, the image processing apparatus 100 may map a value b*w3 obtained by multiplying the pixel value b of the input data 210 by the weight w3 to the second pixel 252 of the output data 250, map a value b*w4 obtained by multiplying the pixel value b by the weight w4 to a third pixel 253 of the output data 250, and map a value b*w5 obtained by multiplying the pixel value b by the weight w5 to a fourth pixel 254 of the output data 250.

In this regard, when moving data being a target of a deconvolution operation by one pixel in the input data 210, a number of pixels that move a region (mapping region) to which a result value of the deconvolution operation is mapped in the output data 250 is referred to as a stride. For example, the mapping region may be moved pixel by pixel, but as shown in FIG. 2, mapping may be performed by moving the mapping region from the first region 261 to the second region 262 by two or more pixels. Therefore, a size of output data (an output image) may be determined according to a size of the stride.

In the same manner, while scanning the target of the deconvolution operation in the input data 210 from left to right and from the top to the bottom pixel-by-pixel, the weights included in the kernel 230 may be multiplied and mapped to the output data 250.

Referring to FIG. 2, the first area 261 and the second area 262 may overlap each other. Also, a plurality of values may be respectively mapped to pixels included in an overlapping area, and a pixel value of the output data 250 may be determined as a sum of the values mapped to the pixels. For example, the value a*w5 obtained by multiplying the pixel value a of the input data 210 by the weight w5 and the value b*w3 obtained by multiplying the pixel value b of the input data 210 by the weight w3 may be mapped to the second pixel 252 of the output data 250, and a value of the second pixel 252 may be determined as a sum of a*w5 and b*w3.

Figure 3:
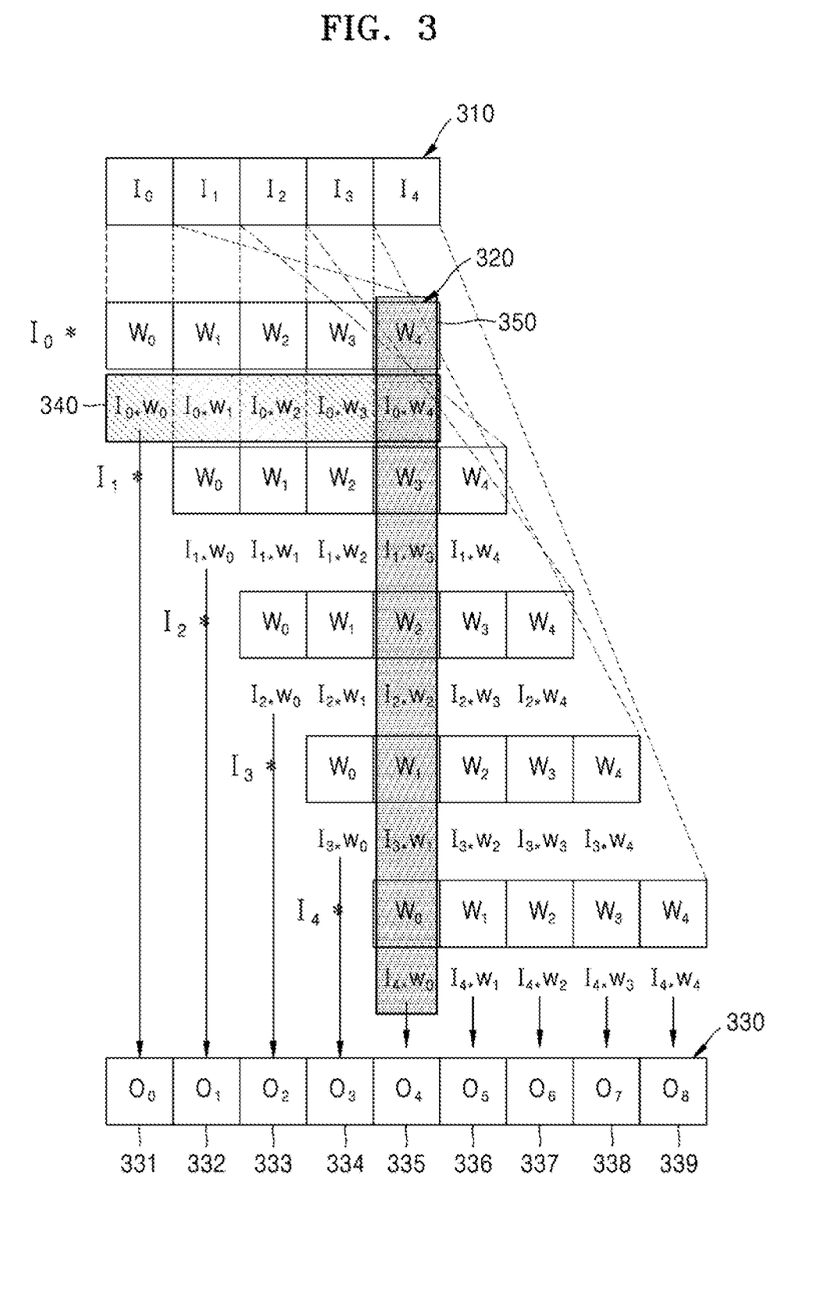
FIG. 3 is a reference diagram for describing a process of performing a deconvolution operation in detail, according to an embodiment.

FIG. 3 is a reference diagram for describing a process of performing a deconvolution operation in detail, according to an embodiment.

For convenience of description, in FIG. 3, it is assumed that input data 310, a kernel 320, and output data 330 are one-dimensional. Also, it is assumed that a size of the input data 310 is 5, a size of the kernel 320 used in the input data 310 is 5, a size of a stride is 1, and a size of the output data 330 is 9.

Referring to FIG. 3, values $I_0*w0$, $I_0*w1$, $I_0*w2$, $I_0*w3$, and $I_0*w4$ obtained by multiplying a pixel value $I_0$ of the input data 310 by weights w0, w1, w2, w3, and w4 included in the kernel 320 may be respectively mapped to first to fifth pixels 331, 332, 333, 334, and 335 of the output data 330.

Also, values $I_1*w0$, $I_1*w1$, $I_1*w2$, and $I_1*w3$, and $I_1*w4$ obtained by multiplying a pixel value $I_1$ of the input data 310 by the weights w0, w1, w2, w3, and w4 included in the kernel 320 may be respectively mapped to second to sixth pixels 332, 333, 334, 335, and 336 of the output data 330.

Values $I_2*w0$, $I_2*w1$, $I_2*w2$, $I_2*w3$, and $I_2*w4$ obtained by multiplying a pixel value $I_2$ of the input data 310 by the weights w0, w1, w2, w3, and w4 included in the kernel 320 may be respectively mapped to third to seventh pixels 333, 334, 335, 336, and 337 of the output data 330.

Values $I_3*w0$, $I_3*w1$, $I_3*w2$, $I_3w3$, $I_3*w4$ obtained by multiplying a pixel value $I_3$ of the input data 310 by the weights w0, w1, w2, w3, and w4 included in the kernel 320 may be respectively mapped to fourth to eighth pixels 334, 335, 336, 337, and 338 of the output data 330.

Values $I_4*$ w1, $I_4w2$, $I_4w3$, $I_4w4$ obtained by multiplying a pixel value $I_4$ of the input data 310 by the weights w0, w1, w2, w3, and w4 included in the kernel 320 may be respectively mapped to fifth to ninth pixels 335, 336, 337, 338, and 339 of the output data 330.

Accordingly, a value $O_0$ of the first pixel 331 of the output data 330 is $I_0*w0$, a value $O_1$ of the second pixel 332 is $I_0*w1+I_1*w0$, a value $O_2$ of the third pixel 333 is $I_0*w2+I_1*w1+I_2*w0$, a value $O_3$ of the fourth pixel 334 is $I_0*w3+I_1*w2+I_2*w1+I_3*w0$, and a value $O_4$ of the fifth pixel 335 is $I_0*w4+I_1w3+I_2*w2+I_3*w1+I_4w0$.

When the deconvolution operation is seen based on the input data 310, one pixel value (e.g., $I_0$) of the input data 310 is multiplied by each of a plurality of weights (e.g., w0, w1, w2, w3, and w4), and values 340 obtained by multiplying the plurality of weights are mapped to a plurality of pixels (e.g., 331 to 335) of the output data 330, and thus the deconvolution operation corresponds to a scatter operation. In this regard, when the weights (e.g., w0, w1, w2, w3, and w4) included in the kernel 320 rapidly change, a checkerboard artifact may occur in the output data 330. In particular, in a high-frequency region (region having a large pixel value) of the input data 310, when adjacent weights rapidly change, a checkerboard artifact occurs in a region of the output data 330 corresponding to the high-frequency region.

When the deconvolution operation is seen based on the output data 330, one pixel value (e.g., $O_4$) of the output data 330 is determined as a value obtained by adding values 350 obtained by multiplying each of a plurality of pixel values (e.g., $I_0$, $I_1$, $I_2$, $I_3$, and $I_4$) of the input data 310 by each of the plurality of weights (e.g., w0, w1, w2, w3, and w4), and thus the deconvolution operation corresponds to a gather operation.

In this regard, the weights respectively applied to the pixels included in the output data 330 are not equal to each other. For example, referring to FIG. 3, one weight w0 is applied to the first pixel 331, two weights w0 and w1 are applied to the second pixel 332, three weights w0, w1, and w2 are applied to the third pixel 333, four weights w0, w1, w2, and w3 are applied to the fourth pixel 334, and five weights w0, w1, w2, w3, and w4 are applied to the fifth pixel 335. As such, when a number of weights respectively applied to the pixels included in the output data 330 varies and weights applied to one pixel are not normalized, sums of the weights respectively applied to the pixels of the output data 330 may not be constant.

For example, when a sum of the four weights w0, w1, w2, and w3 applied to the fourth pixel 334 and a sum of the weights w0, w1, w2, w3, and w4 applied to the fifth pixel 335 are not constant, this causes a checkerboard artifact to occur in the output data 330 when the deconvolution operation is performed.

Figure 4:
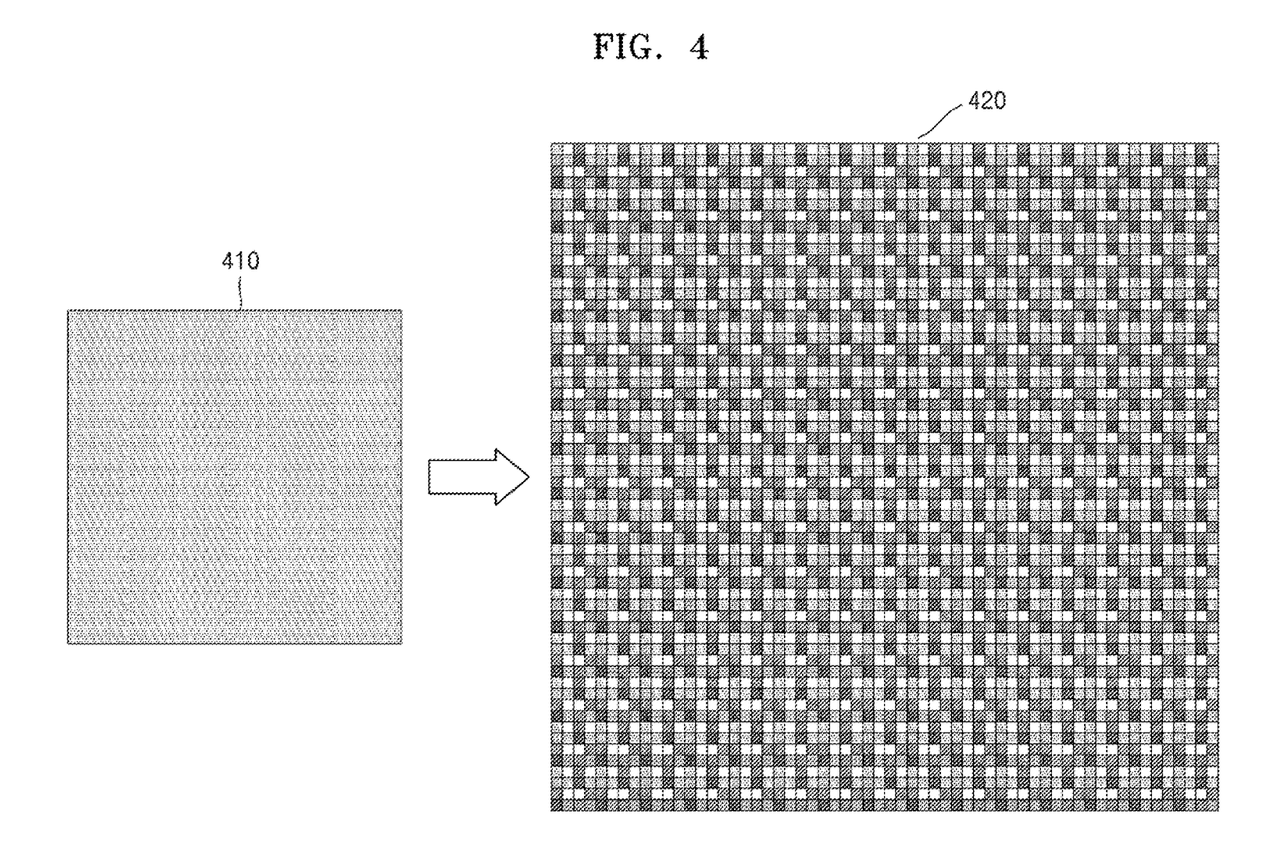
FIG. 4 is a reference diagram for describing a checkerboard artifact occurring when a deconvolution operation is performed.

FIG. 4 is a reference diagram for describing a checkerboard artifact occurring when a deconvolution operation is performed.

Referring to FIG. 4, all pixels included in input data 410 may include a same pixel value (e.g., 1). As described in FIG. 3, when performing the deconvolution operation by applying a kernel including weights, which are not normalized, to the input data 410, output data 420 including a checkerboard artifact may be generated.

For example, when all pixel values of the input data 410 are "1" (when all pieces of input data are "1"), a value of each of pixels included in the output data 420 may be expressed as a sum of weights applied to each of the pixels. In this regard, when weights applied to one pixel are not normalized, sums of weights respectively applied to the pixels are not constant. Accordingly, as shown in FIG. 4, the output data 420 includes a checkerboard artifact having a certain pattern.

In order to prevent occurrence of a checkerboard artifact in the output data 420, the image processing apparatus 100 according to an embodiment may adjust values of the weights so that sums of the weights respectively applied to the pixels are constant. Also, the image processing apparatus 100 may adjust the weights so that the sum of the weights applied to each of the pixels of the output data 420 is "1" in order that values of the pixels of the output data 420 are equal to values (e.g., "1") of the pixels of the input data 410.

Accordingly, the image processing apparatus 100 according to an embodiment may generate a second image (output image), which is an enlarged image of a first image (input image), by performing the deconvolution operation by using a kernel in which values of the weights are adjusted, and thus a checkerboard artifact may not occur in the second image.

Figure 5:
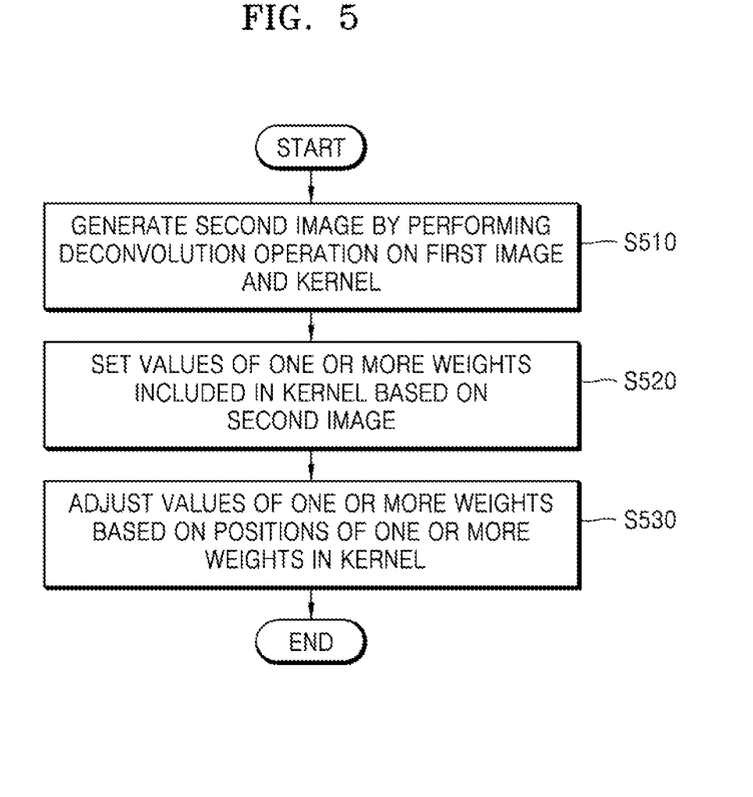
FIG. 5 is a flowchart of an operating method of an image processing apparatus, according to an embodiment.

FIG. 5 is a flowchart of an operating method of an image processing apparatus, according to an embodiment.

Referring to FIG. 5, the image processing apparatus 100 according to an embodiment may generate a second image by performing a deconvolution operation on a first image and a kernel (operation S510).

The deconvolution operation has been described with reference to FIGS. 2 and 3, and thus will not be described in detail. A size of the second image generated as a result of the deconvolution operation is greater than a size of the first image.

The image processing apparatus 100 according to an embodiment may set values of weights included in a kernel used in the deconvolution operation based on the generated second image (operation S520). For example, the image processing apparatus 100 may set the values of the weights of the kernel by using a training algorithm such as error back-propagation or gradient descent.

The image processing apparatus 100 may compare and analyze the second image generated by the deconvolution operation and an enlarged image of the first image and may set the values of the weights of the kernel used in the deconvolution operation based on a result of the analysis.

As described with reference to FIGS. 3 and 4, when the values of the weights included in the kernel rapidly change, a checkerboard artifact may occur in output data.

Also, when weights respectively applied to pixels of the output data are not constant (for example, when numbers of the weights or sums of the weights are not constant), a checkerboard artifact may occur when the deconvolution operation is performed.

Accordingly, the image processing apparatus 100 according to an embodiment may adjust the values of the weights based on positions of the weights included in the kernel (operation S530).

For example, the image processing apparatus 100 may apply a reliability map to the kernel according to an embodiment so that the values of the weights included in the kernel do not rapidly change. Also, the image processing apparatus 100 may divide the weights into a plurality of groups based on the positions of the weights included in the kernel and perform normalization so that sums of weights respectively included in the groups are constant (for example, to be "1").

This will be described in detail with reference to FIGS. 6 and 7.

Figure 6:
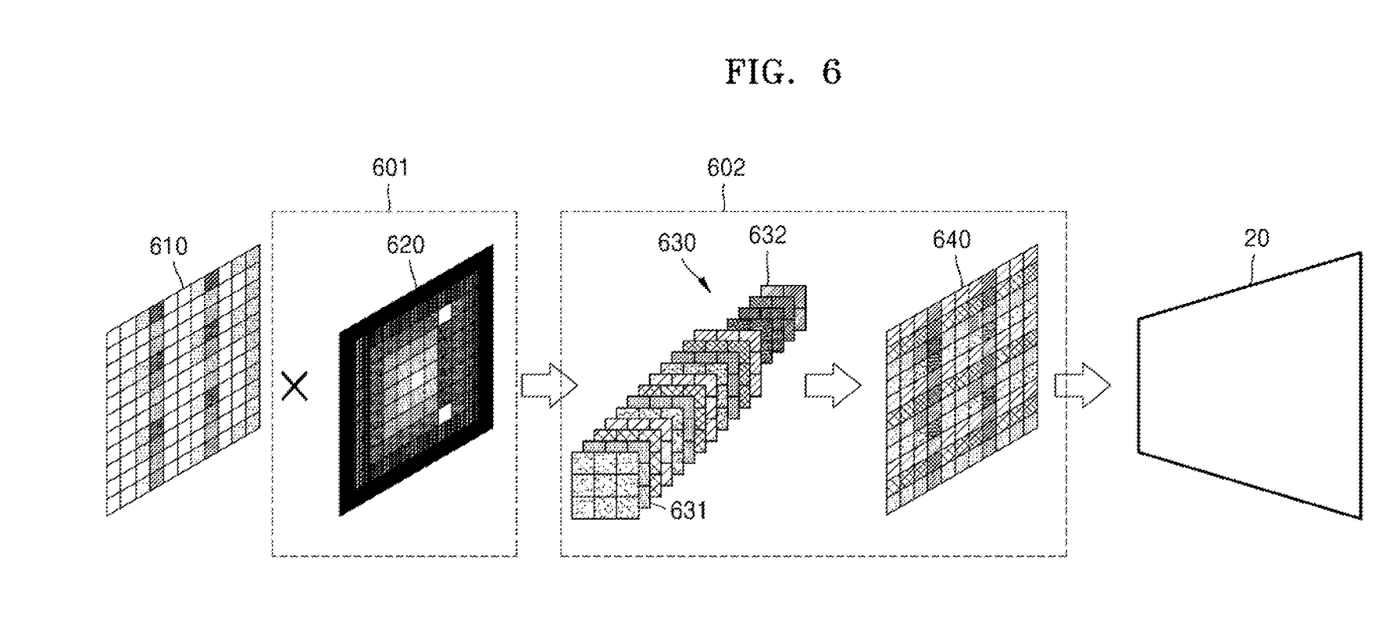
FIG. 6 is a reference diagram for describing a method of adjusting values of one or more weights included in a kernel, according to an embodiment.

FIG. 6 is a reference diagram for describing a method of adjusting values of one or more weights included in a kernel, according to an embodiment.

Referring to FIG. 6, the image processing apparatus 100 may set values of one or more weights included in a kernel 610 used for a deconvolution operation. In this regard, the values of the weights included in the kernel 610 may be set according to training and update of a neural network including a deconvolution layer on which the deconvolution operation is performed. However, the disclosure is not limited thereto.

The image processing apparatus 100 may adjust the values of the one or more weights included in the kernel 610 by applying a reliability map 620 to the kernel 610 (operation 601). The reliability map 620 according to an embodiment may include a map indicating a smoothing function, and the image processing apparatus 100 may adjust the values of the weights included in the kernel 610 by performing a multiplication operation on the kernel 610 and the reliability map 620. For example, the smoothing function according to an embodiment may include at least one of a linear function, a Gaussian function, a Laplacian function, or a spline function, but is not limited thereto. The reliability map 620 shown in FIG. 6 may be a map indicating a Gaussian function.

Also, the smoothing function indicated by the reliability map 620 may be a function in which a map center region has a large value and a value thereof becomes smaller away from the map center region, but is not limited thereto.

According to an embodiment, when the reliability map 620 is applied to the kernel 610, the values of the weights included in the kernel 610 do not rapidly change, and accordingly, a checkerboard artifact may be prevented from occurring in output data. In particular, a checkerboard artifact may be prevented from occurring in a region of the output data corresponding to a high-frequency region (region having a large pixel value) of input data.

Referring back to FIG. 6, the image processing apparatus 100 may group the weights included in the kernel 610 into a plurality of groups 630 based on positions of the weights in the kernel 610. A method of grouping the weights into the groups 630 will be described in detail with reference to FIG. 7.

The image processing apparatus 100 may normalize a sum of the weights for each of the groups 630. For example, when a first group 631 includes nine weights and a second group 632 includes four weights, the image processing apparatus 100 may normalize the weights so that a sum of the nine weights included in the first group 631 and a sum of the four weights included in the second group 632 are equal to each other. In this regard, the image processing apparatus 100 may normalize the weights so that a sum of weights included in one group is 1. However, the disclosure is not limited thereto.

The image processing apparatus 100 may apply a kernel 640 in which the values of the weights are adjusted, to the neural network 20 including the deconvolution layer. Accordingly, the image processing apparatus 100 may perform the deconvolution operation by using the kernel in which the values of the weights are adjusted. For example, the image processing apparatus 100 may generate a second image (output image) by performing the deconvolution operation by applying the kernel in which the values of the weights are adjusted to a first image (input image). In this regard, a size of the second image is greater than a size of the first image, and a checkerboard artifact does not occur in the second image.

Figure 7:
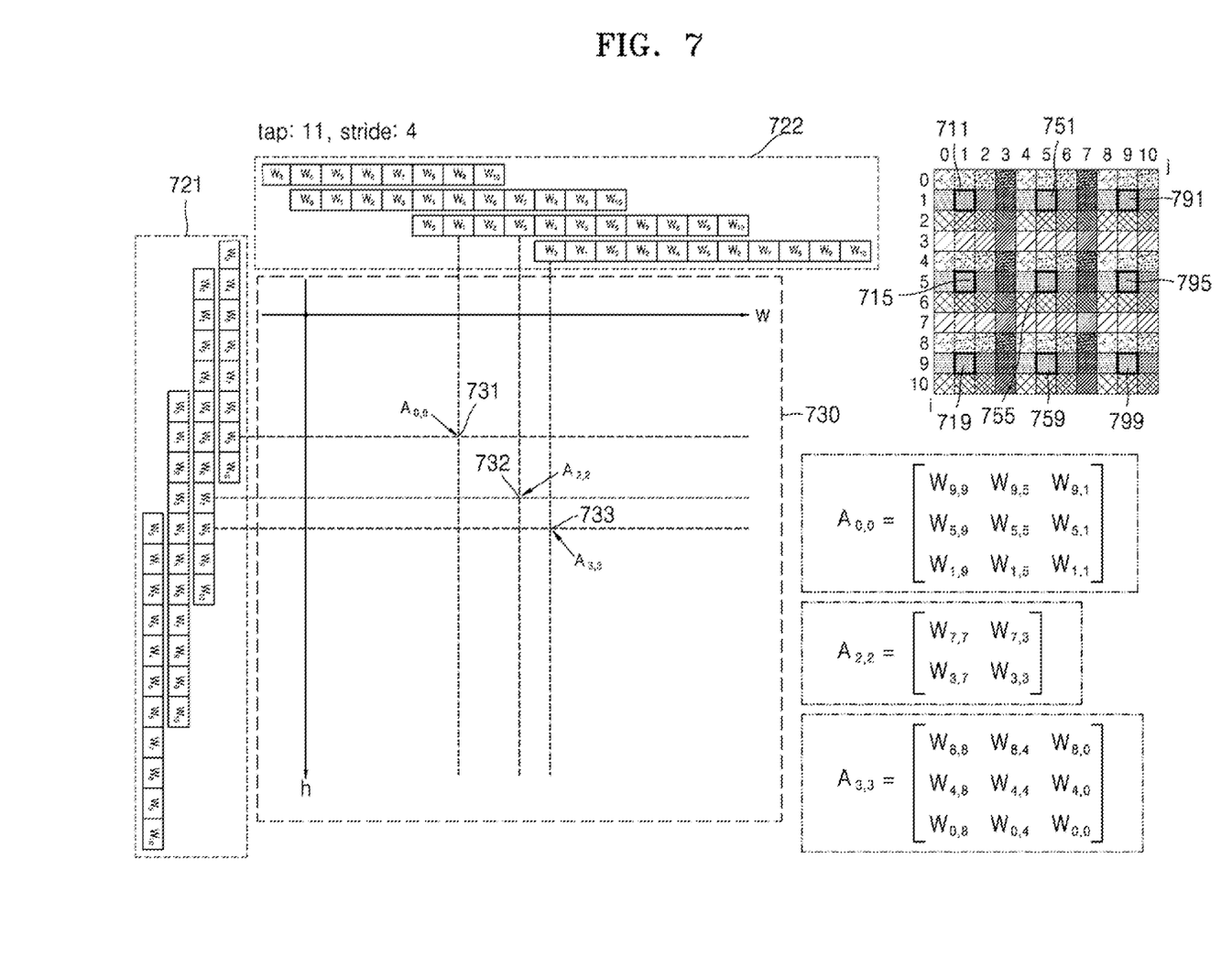
FIG. 7 is a reference diagram for describing a method of dividing weights included in a kernel into a plurality of groups, according to an embodiment.

FIG. 7 is a reference diagram for describing a method of dividing weights included in a kernel into a plurality of groups, according to an embodiment.

In FIG. 7, a method of dividing weights into a plurality of groups when a size (tap) of a kernel 710 is 11×11 and a size of a stride is 4 will be described.

Coordinates 730 shown in FIG. 7 indicate output data, and a horizontal coordinate w indicates a horizontal position of a pixel included in the output data, and a vertical coordinate h indicates a vertical position of a pixel included in the output data.

Assuming that the kernel 710 according to an embodiment is indicated by a two-dimensional matrix (11×11 matrix), indices indicated on weights 722 shown at the top of the coordinates 730 indicate horizontal positions j of the weights 722 in the kernel 710. Also, indices indicated on weights 721 shown in the left of the coordinates 730 indicate vertical positions i of the weights 721 in the kernel 710.

Also, the weights 721 and 722 shown at the top and in the left of the coordinates 730 are shown to correspond to positions of pixels to which the weights are applied, in consideration of the size of the stride (e.g. an interval of four pixels) and the positions of the pixels included in the output data.

For example, horizontal positions j of weights applied to a first pixel 731 included in the output data are 1, 5, and 9, and vertical positions i thereof are 1, 5, and 9. When the horizontal positions and the vertical positions of the weights are combined, the weights applied to the first pixel 731 are $w_{1,1}$ 711, $w_{1,5}$ 715, $w_{1,9}$ 719, $w_{5,1}$ 751, $w_{5,5}$ 755, $w_{5,9}$ 759, $w_{9,1}$ 791, $w_{9,5}$ 795, and $w_{9,9}$ 799, which are included in the kernel 710.

Also, horizontal positions j of weights applied to a second pixel 732 included in the output data are 3 and 7, and vertical positions i thereof are 3 and 7. When the horizontal positions and the vertical positions of the weights are combined, the weights applied to the second pixel 732 are $w_{3,3}$, $w_{3,7}$, $w_{7,3}$, and $w_{7,7}$, which are included in the kernel 710.

Also, horizontal positions j of weights applied to a third pixel 733 included in the output data are 0, 4, and 8, and vertical positions i thereof are 0, 4, and 8. When the horizontal positions and the vertical positions of the weights are combined, the weights applied to the third pixel 733 are $w_{0,0}$, $W_{0,4}$, $W_{0,8}$, $W_{4,0}$, $w_{4,4}$, $w_{4,4}$, $W_{8,0}$, $w_{8,4}$, and $w_{8,8}$, which are included in the kernel 710.

The image processing apparatus 100 may group weights applied to each of the pixels included in the output data into groups. For example, the image processing apparatus 100 may group nine weights applied to the first pixel 731 into a first group and indicate the first group as a matrix $A_{0,0}$ as shown in FIG. 7. Also, the image processing apparatus 100 may group four weights applied to the second pixel 732 into a second group and indicate the second group as a matrix $A_{2,2}$, and may group nine weights applied to the third pixel 733 into a third group and indicate the third group as a matrix $A_{3,3}$.

Among the weights included in the kernel 710 shown in FIG. 7, weights shown in a same color indicate weights included in a same group (applied to a same pixel).

When weights grouped into one group are indicated by one matrix, a matrix size (size($A_{i,j}$)) may be expressed as Equation 1.

$$\text{size}(A_{i,j}) = [M, N] = \left[\text{floor}\left(\frac{(tap-1) - (c+i)}{s}\right) + \text{floor}\left(\frac{c+i}{s}\right) + 1,\right.$$

$$\left.\text{floor}\left(\frac{(tap-1) - (c+i)}{s}\right) + \text{floor}\left(\frac{c+j}{s}\right) + 1\right]$$

[Equation 1]

In Equation 1, floor denotes a discard operation, s denotes a size of a stride, and c may be expressed as Equation 2.

$$s \leq c = \frac{tap-1}{2} \leq 2 \times s$$

[Equation 2]

Referring to Equations 1 and 2, a number of a plurality of groups is determined based on a size (tap) of a kernel and a size (s) of a stride, and a number of weights included in each of the groups is also determined based on the size (tap) of the kernel and the size (s) of the stride.

Also, an index of a component included in the matrix A may be expressed as Equation 3.

$$\begin{bmatrix} w_{t_{M,i}-0\times s, t_{N,j}-0\times s} & w_{t_{M,i}-0\times s, t_{N,j}-1\times s} & \cdots & w_{t_{M,i}-0\times s, t_{N,j}-(N-1)\times s} \\ w_{t_{M,i}-1\times s, t_{N,j}-0\times s} & w_{t_{M,i}-1\times s, t_{N,j}-1\times s} & \cdots & w_{t_{M,i}-1\times s, t_{N,j}-(N-1)\times s} \\ \vdots & \vdots & \ddots & \vdots \\ w_{t_{M,i}-(M-1)\times s, t_{N,j}-0\times s} & w_{t_{M,i}-(M-1)\times s, t_{N,j}-1\times s} & \cdots & w_{t_{M,i}-(M-1)\times s, t_{N,j}-(N-1)\times s} \end{bmatrix}$$

[Equation 3]

In Equation 3, $t_{M,i}$ may be expressed as Equation 4, and $t_{N,j}$ may be expressed as Equation 5.

$$t_{M,i} = (t+1)\%s + (M-1)\times s$$

[Equation 4]

$$t_{N,j} = (t+1)\%s + (N-1)\times s$$

[Equation 5]

In Equations 4 and 5, % denotes a remainder operation. For example, (t+1) % s denotes a remainder obtained when (t+1) is divided by s.

For example, in a case where the size (tap) of the kernel is 11 and the size of the stride (s) is 4, when Equations 1 to 5 are applied for calculations, a size of the matrix $A_{0,0}$ is 3×3 (M=3, N=3), and an index of a first element of the matrix $A_{0,0}$ is $w_{9,9}$.

The image processing apparatus 100 according to an embodiment may normalize a sum of component values (weights) included in each of matrices, with respect to each of the matrices. For example, the image processing apparatus 100 may adjust the weights so that a sum of the weights included in each of the matrices is 1.

Figure 8:
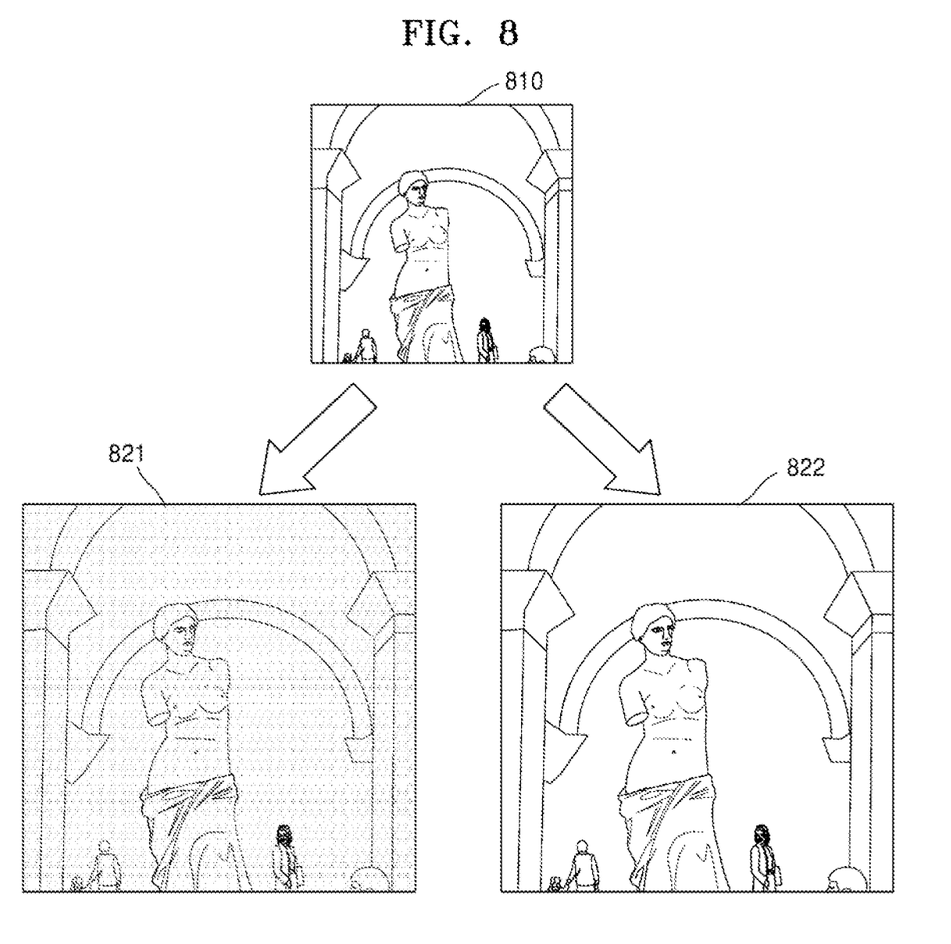
FIG. 8 illustrates an image in which a checkerboard artifact occurs and an image in which a checkerboard artifact does not occur, according to an embodiment.

FIG. 8 illustrates an image in which a checkerboard artifact occurs and an image in which a checkerboard artifact does not occur, according to an embodiment.

Referring to FIG. 8, the image processing apparatus 100 may generate a first output image 821 by performing a deconvolution operation on an input image 810 and a first kernel. In this regard, the first output image 821 may be an image in which a checkerboard artifact has occurred. For example, the first kernel may correspond to the kernel 610 of FIG. 6 and may be a kernel in which application of a reliability map (operation 601) and normalization of weights (operation 602), described in FIGS. 6 and 7, have not been performed.

On the other hand, the image processing apparatus 100 may generate a second output image 822 by performing a deconvolution operation on the input image 810 and a second kernel. In this regard, the second output image 822 may be an image in which a checkerboard artifact has not occurred. For example, the second kernel may correspond to the kernel 640 of FIG. 6. The second kernel may be a kernel in which the application of the reliability map (operation 601) and the normalization of the weights (operation 602) have been performed, as described in FIGS. 6 and 7.

Figure 9:
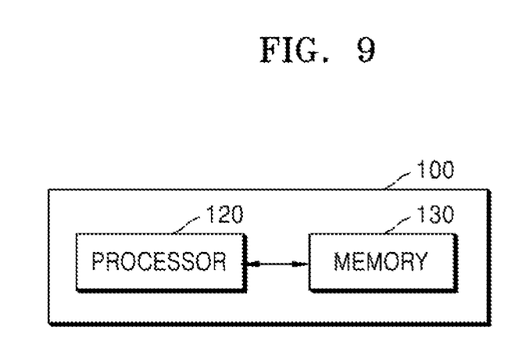
FIG. 9 is a block diagram of a configuration of an image processing apparatus, according to an embodiment.

FIG. 9 is a block diagram of a configuration of an image processing apparatus, according to an embodiment.

Referring to FIG. 9, the image processing apparatus 100 according to an embodiment may include a processor 120 and a memory 130.

The processor 120 according to an embodiment may control the image processing apparatus 100 overall. The processor 120 according to an embodiment may execute one or more programs stored in the memory 130.

The memory 130 according to an embodiment may store various data, programs, or applications for driving and controlling the image processing apparatus 100. The programs stored in the memory 130 may include one or more instructions. The programs (e.g., one or more instructions) or applications stored in the memory 130 may be executed by the processor 120.

The processor 120 according to an embodiment may train a kernel used in a deconvolution operation to generate a second image by performing a deconvolution operation on a first image and a kernel. For example, the processor 120 may set values of weights included in the kernel based on the second image. The processor 120 may set the values of the weights of the kernel by using a training algorithm such as error back-propagation or gradient descent, but is not limited thereto.

The processor 120 may adjust the weights based on positions of the weights included in the kernel. For example, the processor 120 may adjust the weights by applying a reliability map to the kernel. Also, the processor 120 may divide the weights into a plurality of groups based on the positions of the weights included in the kernel and perform normalization so that sums of weights respectively included in the groups are constant (for example, to be "1"). The operation has been described in detail with reference to FIGS. 6 and 7, and thus a detailed description thereof will be omitted.

The processor 120 may generate an output image in which a checkerboard artifact does not occur by performing a deconvolution operation on an input image by using a kernel in which values of weights are adjusted. For example, the processor 120 may generate a second output image 820 of FIG. 8 by performing a deconvolution operation by applying the kernel in which the values of the weights are adjusted to the input image 810 of FIG. 8.

Figure 10:
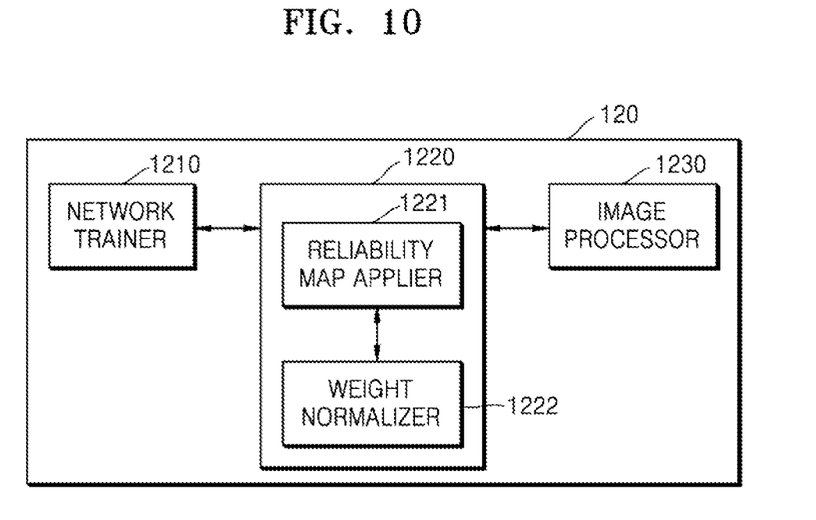
FIG. 10 is a block diagram of a processor according to an embodiment.

FIG. 10 is a block diagram of a processor 120 according to an embodiment.

Referring to FIG. 10, the processor 120 according to an embodiment may include a network trainer 1210, a deconvolution kernel generator 1220, and an image processor 1230.

The network trainer 1210 may train a neural network including a deconvolution layer. Also, the network trainer 1210 may set values of weights of a kernel used in a deconvolution operation performed on the deconvolution layer. For example, the network trainer 1210 may set values of weights of a kernel used in a deconvolution operation to generate a second image which is an enlarged image of a first image.

The network trainer 1210 may store the trained neural network or the weights of the kernel in the memory of the image processing apparatus 100. Alternatively, the neural trainer 1210 may store the trained neural network or the weights of the kernel in a memory of a server connected with the image processing apparatus 100 by wire or wirelessly.

The deconvolution kernel generator 1220 may include a reliability map applier 1221 and a weight normalizer 1222.

The reliability map applier 1221 may apply a reliability map to a kernel trained by the network trainer 1210. The reliability map may include a map indicating a smoothing function, and the smoothing function may include at least one of a linear function, a Gaussian function, a Laplacian function, or a spline function. The reliability map applier 1221 may adjust values of the weights included in the trained kernel by performing a multiplication operation on the trained kernel and the reliability map. By performing the reliability map, the values of the weights included in the kernel do not rapidly change, but may gradually change.

The weight normalizer 1222 may normalize the weights included in the kernel to which the reliability map is applied. For example, the weight normalizer 1222 may divide the weights included in the kernel into a plurality of groups based on positions of the weights in the kernel. For example, the weight normalizer 1222 may group weights applied to each of pixels included in output data into groups.

The weight normalizer 1222 may normalize a sum of the weights for each of the groups. For example, the weight normalizer 1222 may adjust values of the weights so that sums of weights respectively included in the groups are equal to each other (for example, to be "1").

The image processor 1230 may perform a deconvolution operation by using a kernel (e.g., a normalized kernel) in which the values of the weights are adjusted by the reliability map applier 1221 and the weight normalizer 1222. For example, the image processor 1230 may generate a second image (output image) by performing the deconvolution operation by applying the kernel in which the values of the weights are adjusted to a first image (input image). In this regard, a size of the second image is greater than a size of the first image, and a checkerboard artifact does not occur in the second image.

At least one of the network trainer 1210, the deconvolution kernel generator 1220, or the image processor 1230 may be manufactured in the form of a hardware chip and mounted on the image processing apparatus 100. For example, at least one of the network trainer 1210, the deconvolution kernel generator 1220, or the image processor 1230 may be manufactured in the form of a dedicated hardware chip for artificial intelligence (AI), or may be manufactured as a part of an existing general-purpose processor (e.g., a central processing unit (CPU) or an application processor) or a dedicated graphics processor (e.g., a graphics processing unit (GPU) and mounted on various image processing apparatuses described above.

In this case, the network trainer 1210, the deconvolution kernel generator 1220, and the image processor 1230 may be mounted on one image processing apparatus or separate image processing apparatuses, respectively. For example, some of the network trainer 1210, the deconvolution kernel generator 1220, and the image processor 1230 may be included in an image processing apparatus, and others thereof may be included in a server.

Also, at least one of the network trainer 1210, the deconvolution kernel generator 1220, or the image processor 1230 may be implemented as a software module. When at least one of the network trainer 1210, the deconvolution kernel generator 1220, or the image processor 1230 is implemented as a software module (or a program module including instructions, the software module may be stored in a non-transitory computer-readable medium. Also, in this case, at least one software module may be provided by an operating system (OS) or a certain application. Alternatively, a part of at least one software module may be provided by an OS, and the remaining part may be provided by a certain application.

The block diagrams of the image processing apparatus 100 and the processor 120 shown in FIGS. 9 and 10, respectively, are block diagrams for an embodiment of the disclosure. Elements of the block diagram may be integrated, added, or omitted depending on the specifications of the image processing apparatus 100 implemented actually. That is, when necessary, two or more elements may be integrated into one element or one element may be divided into two or more elements. A function executed in each element (or module) is intended to describe embodiments of the disclosure, and a detailed operation or apparatus thereof does not limit the scope of the disclosure.

The operating method of the image processing apparatus according to an embodiment may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program commands include a machine language code created by a complier and a high-level language code executable by a computer using an interpreter.

The image processing apparatus and the operating method of the image processing apparatus according to the embodiments may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of an S/W program electronically distributed through a manufacturer or the electronic device or an electronic market (e.g., Google Play Store™ or App Store™). For the electronic distribution, at least a portion of the S/W program may be stored in a storage medium or temporarily generated. In this case, the storage medium may be a storage medium of a server in the manufacturer or the electronic market or a relay server that temporarily stores the S/W program.

The computer program product may include a storage medium of a server or a storage medium of a client device, in a system including the server and the client device. Alternatively, when there is a third device (e.g., a smartphone) communicating with the server or the client device, the computer program product may include a storage medium of the third device. Alternatively, the computer program product may include an S/W program itself, which is transmitted from the server to the client device or the third device or transmitted from the third device to client device.

In this case, one of the server, the client device, and the third device may execute the computer program product to perform the method according to the embodiments of the disclosure. Alternatively, two or more of the server, the client device, and the third device may execute the computer program product to execute the method according to the embodiments of the disclosure in a distributed manner.

For example, a server (e.g., a cloud server or AI server, etc.) may execute a computer program product stored in the server to control the client device communicating with the server to perform the method according to the embodiments of the disclosure.

While the disclosure has been shown and described with reference to certain example embodiments thereof, the scope of the disclosure is not limited to the description and also includes various modifications and improvements made by those of ordinary skill in the art using the concept of the disclosure defined in the appended claims.

The invention claimed is:

1. An image processing apparatus comprising:
 a memory storing one or more instructions; and
 a processor configured to execute the one or more instructions stored in the memory,
 wherein the processor is further configured to execute the one or more instructions to:
 divide one or more weights included in a kernel into a plurality of groups based on positions of the one or more weights in the kernel, a size of the kernel, and a size of a stride used in a deconvolution operation, wherein values of the one or more weights are set based on a second image generated by performing the deconvolution operation on a first image;
 adjust the values of the one or more weights such that sums of weights respectively included in the plurality of groups are equal to each other; and
 generate an output image by performing the deconvolution operation by applying the kernel in which the values of the one or more weights are adjusted to an input image.

2. The image processing apparatus of claim 1, wherein the processor is further configured to execute the one or more instructions to adjust the values of the one or more weights so that a sum of weights included in each of the plurality of groups is 1.

3. The image processing apparatus of claim 1, wherein the processor is further configured to execute the one or more instructions to determine a number of the plurality of groups based on the size of the kernel and the size of the stride used in the deconvolution operation.

4. The image processing apparatus of claim 1, wherein the processor is further configured to execute the one or more instructions to determine a number of the weights included in each of the plurality of groups based on the size of the kernel and the size of the stride used in the deconvolution operation.

5. The image processing apparatus of claim 1, wherein the processor is further configured to execute the one or more instructions to adjust the values of the weights by applying a reliability map comprising a smoothing function to the kernel.

6. The image processing apparatus of claim 5, wherein the smoothing function comprises a function of a form in which a value gradually changes based on a center of the reliability map.

7. The image processing apparatus of claim 6, wherein the smoothing function comprises at least one of a linear function, a Gaussian function, a Laplacian function, or a spline function.

8. The image processing apparatus of claim 1, wherein a size of the second image is greater than a size of the first image.

9. An operating method of an image processing apparatus, the operating method comprising:
dividing one or more weights included in a kernel into a plurality of groups based on positions of the one or more weights in the kernel a size of the kernel, and a size of a stride used in a deconvolution operation, wherein values of the one or more weights are set based on a second image generated by performing the deconvolution operation on a first image;
adjusting the values of the one or more weights such that sums of weights respectively included in the plurality of groups are equal to each other; and
generating an output image by performing the deconvolution operation by applying the kernel in which the values of the one or more weights are adjusted to an input image.

10. The operating method of claim 9, wherein the adjusting of the values of the one or more weights comprises adjusting the values of the one or more weights so that a sum of weights included in each of the plurality of groups is 1.

11. The operating method of claim 9, wherein the dividing one or more weights into the plurality of groups based on the positions of the one or more weights in the kernel comprises determining a number of the plurality of groups based on the size of the kernel and the size of the stride used in the deconvolution operation.

12. The operating method of claim 9, wherein the dividing one or more weights into the plurality of groups based on the positions of the one or more weights in the kernel comprises determining a number of the weights included in each of the plurality of groups based on the size of the kernel and the size of the stride used in the deconvolution operation.

13. The operating method of claim 9, wherein the adjusting of the values of the one or more weights comprises adjusting the values of the weights by applying a reliability map comprising a smoothing function to the kernel.

14. The operating method of claim 13, wherein the smoothing function comprises a function of a form in which a value gradually changes based on a center of the reliability map.

15. The operating method of claim 9, wherein a size of the second image is greater than a size of the first image.

16. A computer program product comprising one or more non-transitory computer-readable recording media having stored therein a computer program for:
dividing one or more weights included in a kernel into a plurality of groups based on positions of the one or more weights in the kernel, a size of the kernel, and a size of a stride used in a deconvolution operation, wherein values of the one or more weights are set based on a second image generated by performing the deconvolution operation on a first image;
adjusting the values of the one or more weights such that sums of weights respectively included in the plurality of groups are equal to each other; and
generating an output image by performing the deconvolution operation by applying the kernel in which the values of the one or more weights are adjusted to an input image.

\* \* \* \* \*